(12) United States Patent
Bogaerts

(10) Patent No.: US 11,249,371 B2
(45) Date of Patent: Feb. 15, 2022

(54) DISPERSIVE OPTICAL PHASED ARRAY FOR TWO-DIMENSIONAL SCANNING

(71) Applicants: IMEC VZW, Leuven (BE); Universiteit Gent, Ghent (BE)

(72) Inventor: Wim Bogaerts, Melle (BE)

(73) Assignees: IMEC vzw, Leuven (BE); Universiteit Gent, Ghent (BE)

( * ) Notice: Subject to any disclaimer, the term of this patent is extended or adjusted under 35 U.S.C. 154(b) by 79 days.

(21) Appl. No.: 16/986,539

(22) Filed: Aug. 6, 2020

(65) Prior Publication Data

US 2021/0048724 A1 Feb. 18, 2021

(30) Foreign Application Priority Data

Aug. 13, 2019 (EP) .................................... 19191388

(51) Int. Cl.
 G02F 1/295 (2006.01)

(52) U.S. Cl.
 CPC .................................. G02F 1/2955 (2013.01)

(58) Field of Classification Search
 CPC .... G02F 1/2955; G01S 17/931; G01S 7/4817; G01S 17/42; G02B 6/12014; G02B 6/12016; G02B 26/10; G02B 27/0087
 See application file for complete search history.

(56) References Cited

U.S. PATENT DOCUMENTS

| | | | |
|---|---|---|---|
| 9,104,086 B1 | 8/2015 | Davids et al. | |
| 9,740,079 B1 | 8/2017 | Davids et al. | |
| 9,753,351 B2 * | 9/2017 | Eldada | G02F 1/292 |
| 11,112,491 B2 * | 9/2021 | Abediasl | G02F 1/292 |
| 2015/0378241 A1 | 12/2015 | Eldada | |

FOREIGN PATENT DOCUMENTS

| | | |
|---|---|---|
| WO | 2018204658 A1 | 11/2018 |
| WO | 2019002514 A1 | 1/2019 |

OTHER PUBLICATIONS

Extended European Search Report and Written Opinion, EP Application No. 19191388.8, dated Feb. 13, 2020, 12 pages.

(Continued)

*Primary Examiner* — John Bedtelyon
(74) *Attorney, Agent, or Firm* — McDonnell Boehnen Hulbert & Berghoff LLP

(57) ABSTRACT

A dispersive optical phased array for two-dimensional scanning is disclosed herein. The array comprises antenna blocks positioned adjacent one another. The antenna blocks comprise a plurality of antennas positioned adjacent one another and a plurality of delay lines to couple a coherent source signal to each of the antennas within the block, each delay line having an optical path length. Each of the antenna blocks acts as a dispersive phased array. The antenna blocks are arranged such that the blocks form a larger phased array where the antennas between the blocks are in phase for a discrete set of wavelengths. All antennas over the dispersive phased array can experience the same phase difference such that the beams of the individual antenna blocks align with one of the diffraction orders of the array of blocks.

20 Claims, 15 Drawing Sheets

(56) References Cited

OTHER PUBLICATIONS

Van Acoleyen, Karel, Wim Bogaerts, and Roel Baets. "Two-dimensional dispersive off-chip beam scanner fabricated on silicon-on-insulator." IEEE photonics technology letters 23, No. 17 (2011): 1270-1272.

Xiao, Feng, Guangyuan Li, and Anshi Xu. "Cascade arrangement of irregular optical phased arrays." Optics communications 281, No. 8 (2008): 1945-1949.

Chang, Yian, H. R. Fetterman, B. Tsap, A. F. J. Levi, D. A. Cohen, and I. L. Newberg. "Optically controlled serially fed phased array radar." In 1998 IEEE MTT-S International Microwave Symposium Digest (Cat. No. 98CH36192), vol. 3, pp. 1367-1370. IEEE, 1998.

Chan, Trevor, Evgeny Myslivets, and Joseph E. Ford. "2-Dimensional beamsteering using dispersive deflectors and wavelength tuning." Optics Express 16, No. 19 (2008): 14617-14628.

\* cited by examiner

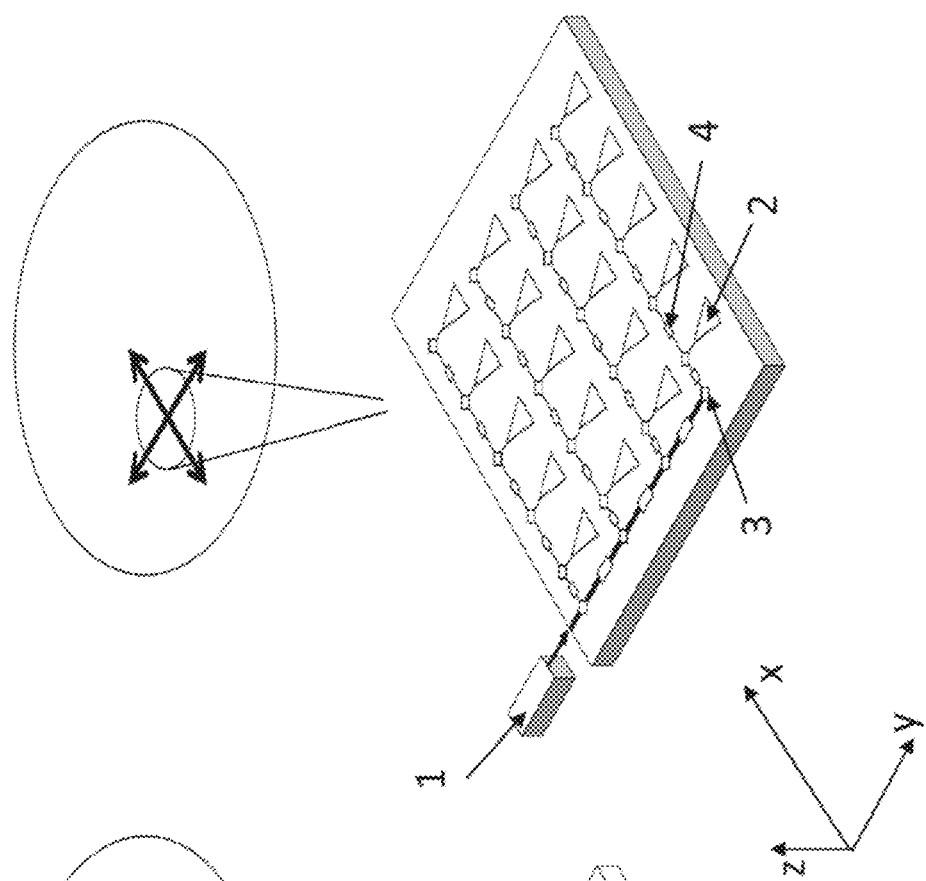
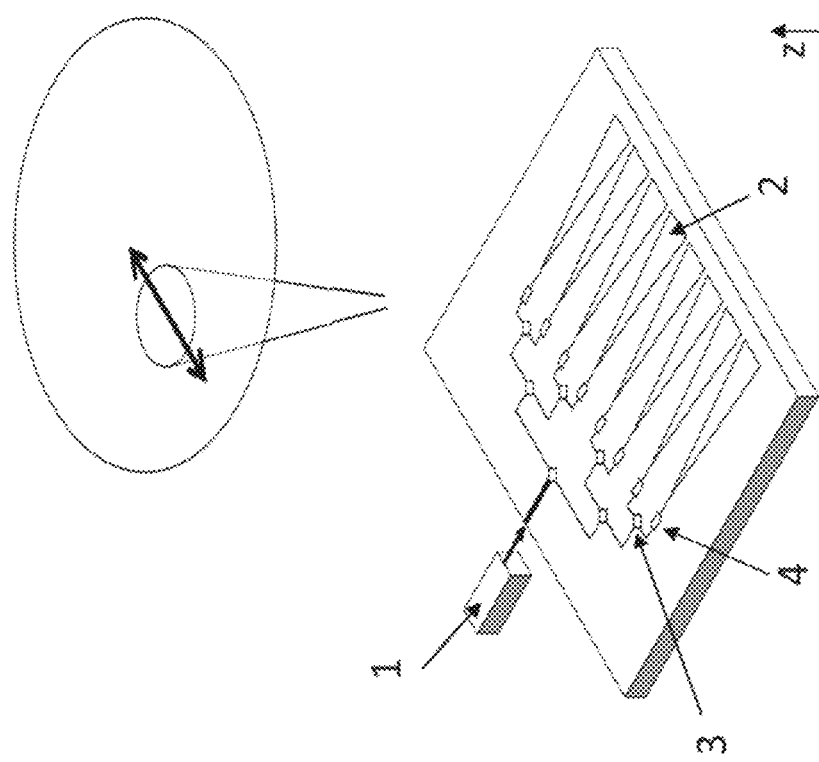
*Fig. 2*
*Prior Art*
*Fig. 1*
*Prior Art*

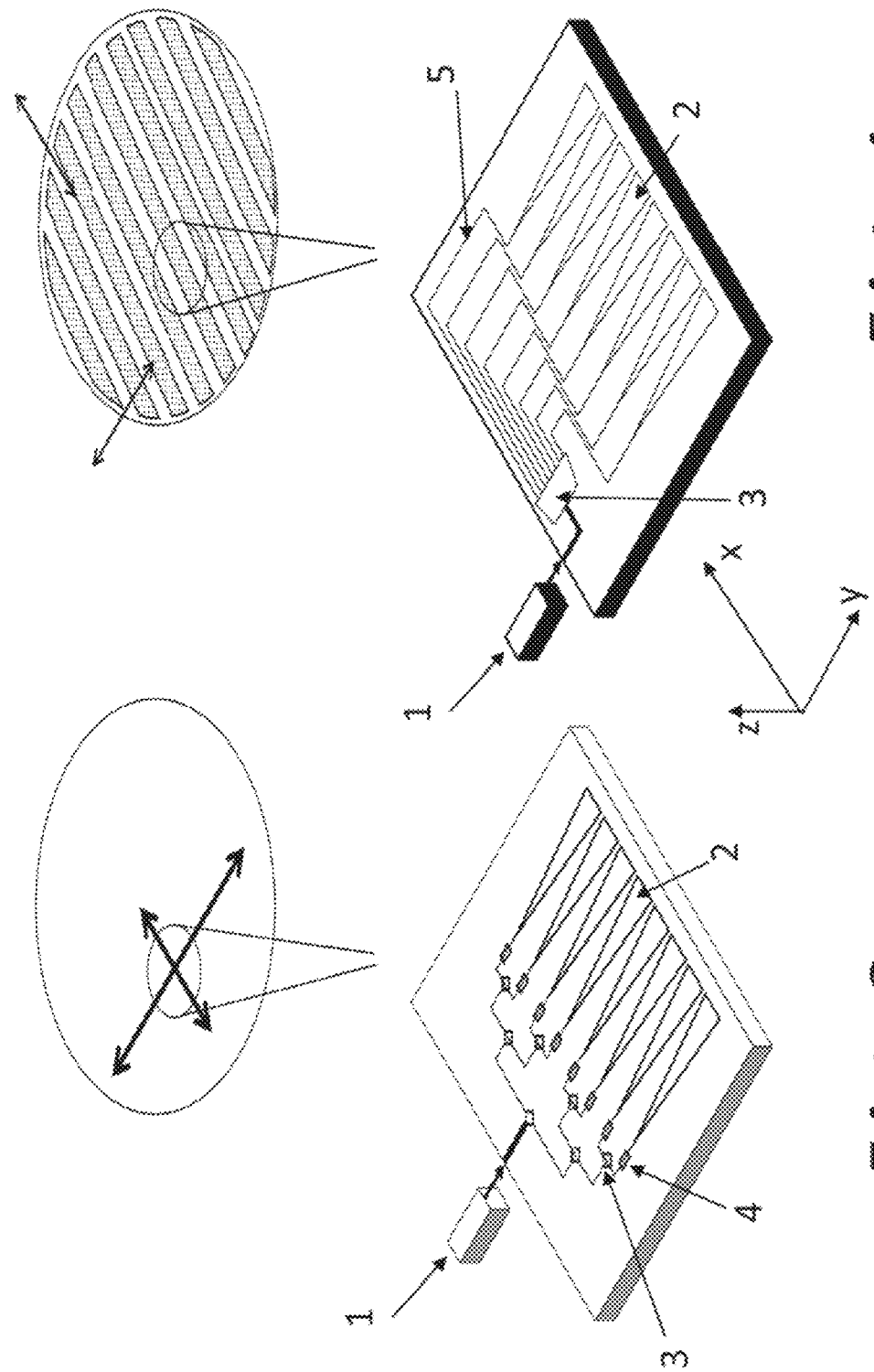

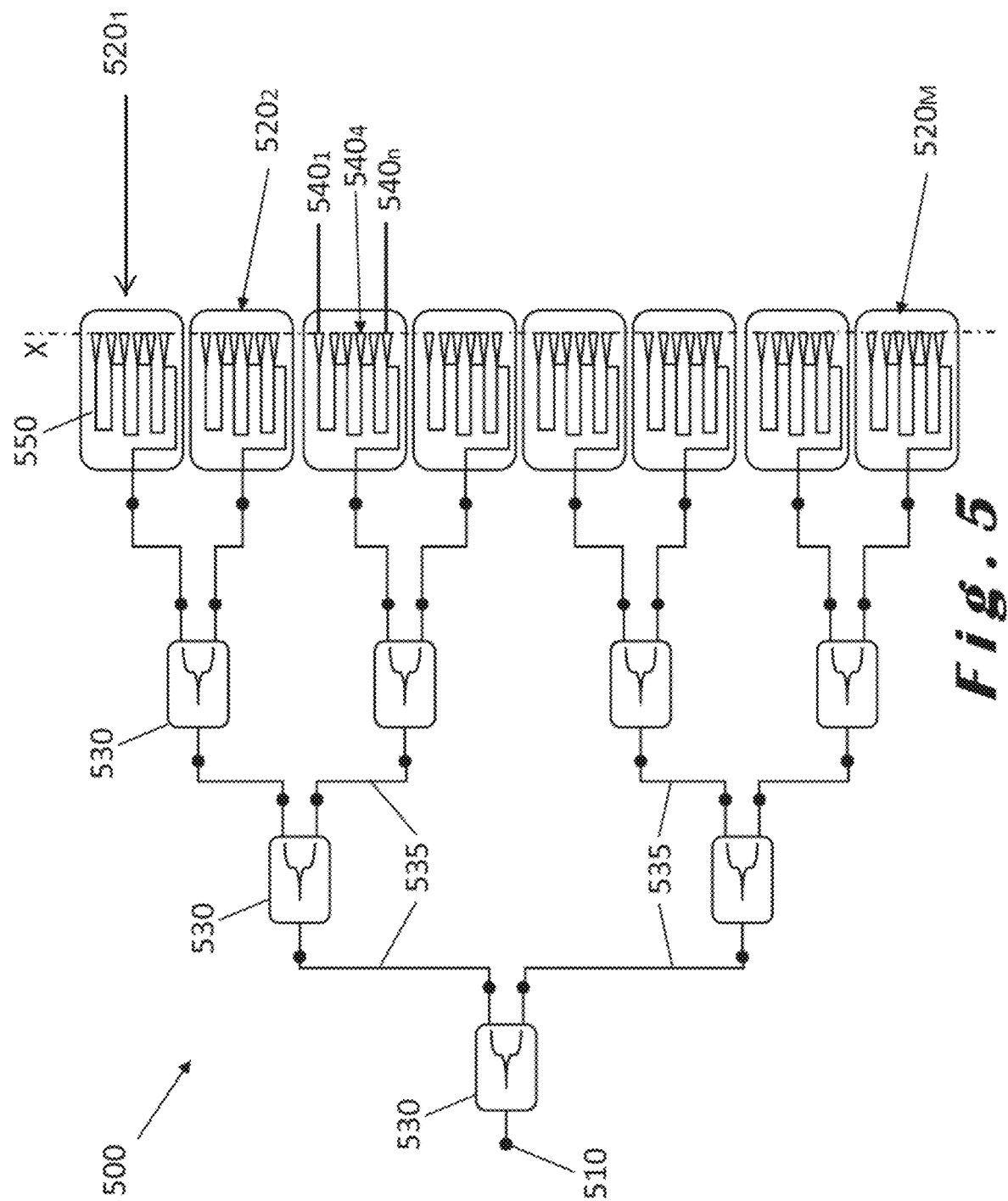

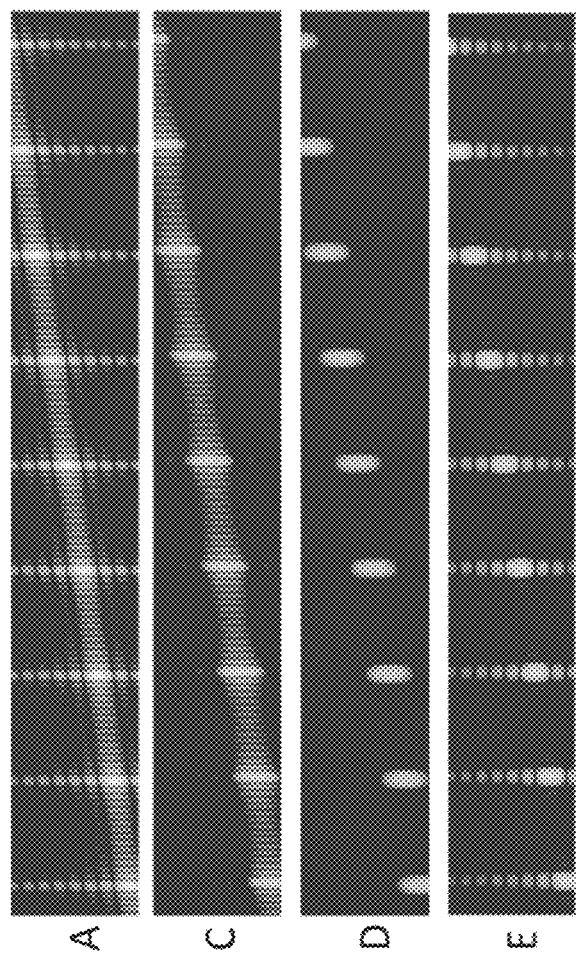

DISPERSIVE OPTICAL PHASED ARRAY FOR TWO-DIMENSIONAL SCANNING

CROSS-REFERENCE TO RELATED APPLICATIONS

The present application is a non-provisional patent application claiming priority to European Application No. 19191388.8, filed Aug. 13, 2019, the contents of which are hereby incorporated by reference.

FIELD OF THE DISCLOSURE

The present disclosure relates to a dispersive optical phased array for two-dimensional scanning.

BACKGROUND

An Optical Phased Array (OPA) comprises multiple emitting optical antennas that together form a large emitter for a focused beam. The antennas are usually integrated on a chip in the form of grating couplers. In the present context, we distinguish between two types of OPAs, which we describe as non-dispersive and dispersive OPAs.

A non-dispersive OPA is a classical phased array that is schematically shown in FIG. 1 and FIG. 2. FIG. 1 shows a one-dimensional (1D) non-dispersive OPA and FIG. 2 shows a two-dimensional (2D) non-dispersive OPA. A single-wavelength coherent source signal (e.g., generated by laser 1) is distributed over different emitting antennas 2 by couplers 3. This signal is fed to the multiple antennas 2 with a given phase delay and, based on the phase delay between the adjacent antennas, the far-field beam can be directed. The phase delay is usually induced using electro-optic phase shifters 4.

One of the difficulties with such an OPA is accurate control of the many phase shifters, in particular when fast scanning is required. For an OPA for LiDAR use, the requirements for beam quality and range easily impose the need for thousands of antennas in both x- and y-directions.

A dispersive OPA introduces wavelength as a means to scan the beam of light. One or more tuneable lasers are used to change the wavelength (either continuously or in discrete hops) and the OPA sends the light in a different direction depending on the wavelength. This steering can be done through two mechanisms which are illustrated in FIG. 3 and FIG. 4.

FIG. 3 shows a dispersive OPA including a tuneable laser 1 that outputs a coherent source signal with a wavelength that can be tuned, i.e., can be varied across a pre-set interval. The signal is fed to the multiple antennas 2 with a given power distribution and phase delay by couplers 3. Based on the phase delay between the adjacent antennas, the far-field beam can be directed. The phase delay can be induced using electro-optic phase shifters 4. In this way, the x-direction can be scanned by a one-dimensional array of phase shifters. The antennas 2, which often are formed by a waveguide diffraction grating, radiate light off-chip at a different angle (along the y direction) depending on the wavelength. In this way, the y-direction can be scanned by the wavelength variation. A potential advantage of this system is that any point in 2D space can be reached by a 1D array of phase shifters and antennas. However, the x-scanning speed depends on the speed of the phase shifters, and the beam quality on their accurate control. The y-scanning speed and resolution depends on the control of the wavelength of the tuneable laser.

FIG. 4 illustrates a different way of constructing a dispersive OPA. Tuneable laser 1 inputs its generated signal into a splitter 3 which splits the signal into multiple waveguides. Each of the waveguides has different length and acts as an optical delay line 5 with a delay L. Note that $\Delta L$ defines an optical delay which is given by the actual path length multiplied by the optical effective index (when the waveguide has a wavelength-dependent effective index, the phase delay is actually determined by the delay length multiplied by the waveguide's effective index, which itself varies slightly with wavelength). Because the delay lines 5 can be long, an active phase compensation section (not shown) can be included to make sure all lines 5 have the correct, i.e., desired, optical delay. These active phase compensation sections are static, and do not need to be tuned or swept rapidly. The antennas 2 individually emit at a wide angle along the x-direction, but, when excited together, they operate as a phased array, emitting a narrow beam in a direction which is determined by the optical phase delay between each two antennas 2. Because the antennas 2 are fed from an array of delay lines 5, the phase difference $\Delta\phi$ is wavelength dependent and is given by $$\Delta\phi = 2\pi \frac{\Delta L}{\lambda}, \quad (1)$$

where $\Delta L$ is the optical delay, i.e., the product of the physical delay and the waveguide's effective index at that particular wavelength.

Therefore, by changing the input wavelength of the light, the beam is steered into a different direction (along both the x axis and the y-axis of the array). If the delay length $\Delta L$ is large, only a small wavelength shift is needed to steer the beam over the full angular range and the beam will scan very rapidly as function of wavelength in the x-direction, i.e. much more rapidly than the antennas are scanning the y-direction. As a result, the beam will scan the 2D space as a series of lines as illustrated in the top part of FIG. 4. Such a 2D dispersive OPA was disclosed in K. Van Acoleyen, W. Bogaerts, R. Baets, *Two-dimensional Dispersive Off-chip Beam Scanner Fabricated on Silicon-On-Insulator*, IEEE Photonics Technology Letters, 23(17), p. 1270-1272 (2011).

The potential advantages of such a 2D dispersive OPA are that it only requires a 1D antenna array while offering a 2D scan. Moreover, there is only a single variable to be changed, i.e. the wavelength of the laser, to have a 2D scan. Further, it only requires a passive, or slowly tuneable optical circuit.

However, the major drawback of such an OPA is that is does not easily scale up to a large number of antennas. If one increases the number of antennas, the number of delay lines and the total waveguide length becomes excessive. Long waveguides introduce more loss, but also phase errors that will disrupt the phase relation between the antennas and require active compensation (which consumes power). Moreover, the increasingly long delay lines also result in a large chip footprint.

The number of antennas is dictated by several factors, depending on the application. A first factor is the desired angular sweep range. This determines the spacing between the individual antennas. For a 45-degree sweep range, the antennas should be about 2 µm apart (for wavelengths around 1,550 nm). A second factor is the range or beam divergence. The size of the total emitting patch (the aperture) is proportional to the square root of the desired Rayleigh range. For a 200 m range (typically required LiDAR applications), this would require an emitting patch of about 15 mm wide (for wavelengths around 1,550 nm). With the aforementioned 45-degree field of view, this would require about 7,500 antennas. A third factor is the required sampling angle in the far field. The smaller the sampling angle, the narrower the beam needs to be. The number of antennas is also roughly equal to the number of angular sampling points in the far field. Sampling a 45 degree field of view with 900 points (i.e., a 0.05 degree sampling resolution) would require about 900 antennas.

Clearly, the required number of antennas for commercial applications is much larger than could be achieved with the design disclosed in Van Acoleyen, W. Bogaerts, R. Baets, *Two-dimensional Dispersive Off-chip Beam Scanner Fabricated on Silicon-On-Insulator*, IEEE Photonics Technology Letters, 23(17), p. 1270-1272 (2011) which only has 16 antennas.

SUMMARY

It is a potential benefit of the present disclosure to provide a dispersive phased array for two-dimensional scanning that may be scaled-up more easily.

This can be achieved according to the disclosure with a dispersive optical phased array for two-dimensional scanning, the array comprising: injection means for injecting a coherent optical source signal to the array, the source signal having a time-varying carrier wavelength $\lambda(t)$, wherein the time-varying carrier wavelength varies within a predefined carrier wavelength interval; M antenna blocks positioned adjacent one another along a substantially straight line, where M is a natural number of at least two and where j denotes the $j^{th}$ antenna block of the M antenna blocks, j being a natural number between 1 and M; and coupling means for coupling the coherent optical source signal to each of the M antenna blocks, wherein each of the M antenna blocks comprises: a plurality of antennas positioned adjacent one another along the substantially straight line, where $n_j$ is a natural number of at least two that denotes the number of antennas in antenna block j and where $k_j$ denotes the $k^{th}$ antenna of the $j^{th}$ antenna block, $k_j$ being a natural number between 1 and $n_j$; and a plurality of delay lines to couple the coherent source signal to each of the antennas within the block, each delay line having an optical path length $\Delta L_{j,k}$, where $\Delta \Phi_{j,k}$ denotes a phase delay of the $k^{th}$ antenna of the $j^{th}$ antenna block, $\Delta \Phi_{j,k}$ being substantially equal to $\Delta L_{j,k} 2\pi/\lambda(t)$ such that each of the M antenna blocks acts as a dispersive phased array, and wherein, for at least one wavelength within the predefined carrier wavelength interval, all antennas are substantially in phase with one another.

The dispersive optical phased array can be considered as a phased array of M large antenna blocks, where every antenna block is itself a dispersive phased array. Given the size of these antenna blocks (i.e., they contain $n_j$ small antennas themselves), they have a large spacing and the overall phased array has a large number of valid diffraction orders. When the at least one wavelength is used, all antennas over the entire dispersive phased array will experience the same phase difference such that the beams of the individual M antenna blocks align with one of the diffraction orders of the array of blocks, thus resulting in a phased array that will have a narrow, focused beam corresponding with the total large emission area of the $\Sigma n_j$ antennas. The phased array therefore samples with a narrow beam discrete locations in the far field, for the condition where the emission of all antennas is substantially in phase.

In an embodiment of the present disclosure, a difference between the phase delay of the last antenna in the $j^{th}$ antenna block $\Delta \Phi_{j,nj}$ and the phase delay of the first antenna in the $(j+1)^{th}$ antenna block $\Delta \Phi_{j+1}$, is substantially similar to the difference in phase delays between adjacent antennas within a block.

Designing the dispersive optical phased array in such a way can allow having all antennas substantially in phase with one another in a simple way for multiple wavelengths within the predefined carrier wavelength interval.

In an embodiment of the present disclosure, the coupling means do not include delay lines such that each of the M antenna blocks receives the coherent source signal at substantially the same phase difference for substantially all carrier wavelengths within the predefined carrier wavelength interval. The coupling means can include M phase shifters, one phase shifter for each antenna block, the phase shifters being configured to equalize the phase between the plurality of antenna blocks.

In this embodiment, each of the antenna blocks is fed with substantially the same phase signal which can simplify the design. Moreover, the phase shifters can be beneficial as these may correct small deviations in phase due to manufacturing tolerances within the coupling means.

In an alternative embodiment of the present disclosure, the coupling means include M phase shifters, one phase shifter for each antenna block, the phase shifters being configured to shift the coherent source signal such that each of the M antenna blocks receives the coherent source signal with a same phase delay between successive pairs of antenna blocks.

Using such phase shifters can allow shifting the emitted pattern along the x-direction, i.e. the line along which the antenna blocks are aligned.

In an embodiment of the present disclosure, each of the antenna blocks has a same footprint area.

In an embodiment of the present disclosure, each of the antenna blocks has the same number of antennas n.

These embodiments can simplify the design as they can lead to a more symmetrical dispersive phased array.

In an embodiment of the present disclosure, the injection means comprise L tuneable lasers, L being a natural number of at least two, each tuneable laser being configured to generate an optical laser beam covering an interval of carrier wavelengths in a continuous or discrete fashion, wherein the coupling means include a star coupler having L inputs and M outputs. The star coupler can be set up in a Rowland configuration.

In this embodiment, the star coupler acts as a multiplexer for the L tuneable lasers. Specifically, the multiple tuneable lasers can couple light into the star coupler from different input waveguides and spread their light to all output waveguides. A Rowland configuration is beneficial as this minimizes astigmatism and aberrations while, for every input, the optical path difference to all the outputs has the same phase delay between adjacent outputs.

In an alternative embodiment, the coupling means include a star coupler having M output waveguides and i inputs, wherein the i inputs are distributed between the −0.5 and +0.5 diffraction order of the M output waveguides, such that the phase difference of the coherent source signal arriving at adjacent antennas is substantially different for each input. Two adjacent ones of the i inputs can be separated by substantially a 1/i diffraction order of the output waveguides such that the coherent source signal is received at adjacent antenna blocks with a phase difference substantially equal to $2\pi/i$.

In this embodiment, the star coupler can allow reducing the size of the antenna blocks, while maintaining the beam quality and the number of sampling points in the far field. Specifically, the star coupler multiplexes the incoming optical beams such that the output waveguides, coupled to the antenna blocks, have a phase difference.

In an embodiment of the present disclosure, the antenna of one or more of the antenna blocks are organized in one of: a waveguide array, a snake pattern, and an imbalanced tree.

In an embodiment of the present disclosure, the antenna blocks are non-uniformly positioned along the substantially straight line.

In an embodiment of the present disclosure, a spacing between the antenna blocks is non-uniform, the spacing being substantially equal to or a multiple of the spacing between adjacent antennas within a block.

In an embodiment of the present disclosure, power is distributed over the antenna blocks in a normal distribution.

In an embodiment of the present disclosure, power is distributed over the antennas in each antenna block in a normal distribution.

In an embodiment of the present disclosure, power is distributed over the antennas in the entire array in a normal distribution.

These options can provide for a flexible design.

In an embodiment of the present disclosure, the optical path length difference between successive antennas in an antenna block is constant $\Delta L$ such that the phase delay $\Delta\Phi_{j,k}$ is given by $k*2\pi\Delta L/\lambda(t)$.

Such an embodiment can simplify the design as the optical path length difference is constant.

In an embodiment of the present disclosure, the plurality of antennas in an antenna block are periodically positioned, in particular uniformly positioned.

Such a periodic positioning can simplify the array design.

BRIEF DESCRIPTION OF THE FIGURES

The above, as well as additional, features will be better understood through the following illustrative and non-limiting detailed description of example embodiments, with reference to the appended drawings.

The disclosure will be further explained by means of the following description and the appended figures.

FIG. 1 shows a known one-dimensional non-dispersive optical phased array, according to an example embodiment.

FIG. 2 shows a known two-dimensional non-dispersive optical phased array, according to an example embodiment.

FIG. 3 shows a known two-dimensional dispersive optical phased array, according to an example embodiment.

FIG. 4 shows an alternative known two-dimensional dispersive optical phased array, according to an example embodiment.

FIG. 5 shows a dispersive phased array, according to an example embodiment.

FIG. 17 shows the far-field of various dispersive phased arrays, according to an example embodiment.

Figure 6:
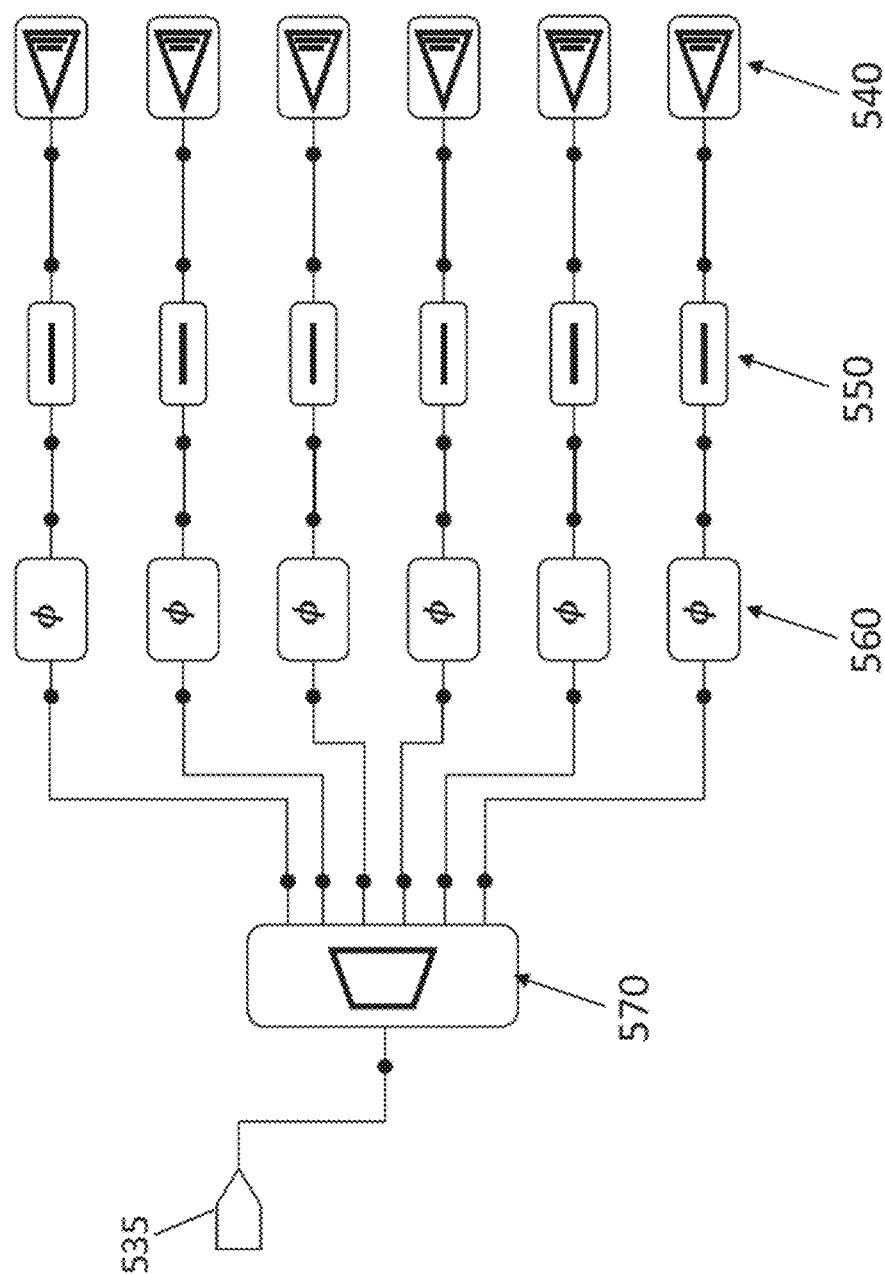
FIG. 6 shows a schematic representation of an antenna block of the dispersive phased array of FIG. 5, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are schematic and are non-limiting. In the drawings, the size of some of the elements may be exaggerated and not drawn to scale for illustrative purposes. The dimensions and the relative dimensions do not necessarily correspond to actual reductions to practice of the disclosure.

Furthermore, the terms first, second, third, and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under, and the like in the description and the claims are used for descriptive purposes. The terms so used are interchangeable under appropriate circumstances and the embodiments of the disclosure described herein can operate in orientations other than described or illustrated herein.

Furthermore, the various embodiments, although referred to as "preferred" are to be construed as exemplary manners in which the disclosure may be implemented rather than as limiting the scope of the disclosure.

A schematic representation of a dispersive phased array 500 of the present disclosure is shown in FIG. 5. The array 500 has injection means 510 for injecting a coherent optical source signal to the array 500, the optical source signal having a time-varying carrier wavelength $\lambda(t)$ that varies within a predefined carrier wavelength interval. There are further 8 (in general M) antenna blocks $520_1$, $520_2$, ..., $520_M$. The antenna blocks $520_1$, $520_2$, ... $520_M$ are positioned adjacent one another along a substantially straight hypothetical line X. In general, M is a natural number of at least two and j denotes the $j^{th}$ antenna block of the M antenna blocks, j being a natural number between 1 and M. The array 500 is provided with coupling means for coupling the coherent optical source signal to each of the M antenna blocks. In the array 500, the coupling means are formed by 7 splitters 530 connected via lines 535. As shown in FIG. 5, the splitters 530 and lines 535 are set up in a balanced tree without differential delays. In this way, the optical source signal is coupled to the antenna blocks without phase differences.

It will be readily appreciated that the lines 535 are designed not to introduce phase differences for substantially all carrier wavelengths within the carrier wavelength interval in which the coherent optical source signal varies.

As shown in FIG. 5, each of the antenna blocks $520j$ comprises a plurality of antennas $540_1$, $540_2$, ..., $540_n$ positioned adjacent to one another along the hypothetical line X. In FIG. 5, each antenna block has the same number of antennas, namely n, where n is a natural number of at least two. However, as described in more detail below, the disclosure is not limited to a constant number of antennas per block. Therefore, in general, $n_j$ is a natural number of at least two that denotes the number of antennas in antenna block j and $k_j$ denotes the $k^{th}$ antenna of the $j^{th}$ antenna block, $k_j$ being a natural number between 1 and $n_j$. The antenna blocks $520_j$ further comprise a plurality of delay lines 550 to couple the coherent source signal to each of the antennas $540_k$ within the block $520_j$, each delay line having an optical path length $\Delta L_{j,k}$.

Due to this construction, there is a phase delay between the antennas $540_k$ within the block $520_j$. In general, $\Delta\Phi_{j,k}$ denotes a phase delay of the $k^{th}$ antenna of the $j^{th}$ antenna block and is substantially equal to $\Delta L_{j,k} 2\pi/\lambda(t)$. Due to this construction, each of the M antenna blocks $520_j$ acts as a dispersive phased array.

In other words, the array 500 can be considered as a symmetric phased array of M large antennas, where every block $520_j$ is itself a phased array, and beaming light in a different direction depending on the wavelength. Given the large size of these blocks $520_j$ (they contain n small antennas $540_k$ themselves), they have a large spacing and the overall phased array 500 has a large number of valid diffraction orders (i.e. approximately n within the scanning range of the phased array 500). This results in a phased array 500 that will have a narrow beam (because it has a total large emission area with M×n antennas), but generally only when the beam of the individual M blocks $520_j$ coincides with one of the n diffraction orders. This happens when all antennas $540_k$ over the entire compound phased array 500 have the same phase difference, i.e. when all antennas are substantially in phase with one another.

Because the phase difference within the M blocks $520_j$ is dictated by the dispersive delay line, the condition, i.e. all antennas being substantially in phase with one another, is met when the difference between the phase delay of the last antenna in the $j^{th}$ antenna block $\Delta\Phi_{j,nj}$ and the phase delay of the first antenna in the $(j+1)^{th}$ antenna block $\Delta\Phi_{j+1}$, is substantially similar to the difference in phase delays between adjacent antennas within a block.

However, it will be readily appreciated that the condition may also be met in other ways, especially considering that the phase delay between adjacent antennas need not be constant over the entire array 500. In general, the condition will be met by considering both the phase delay between the antennas and their spacing such that all antennas are substantially in phase with one another for one or more wavelengths within the predefined carrier wavelength interval.

Figure 7:
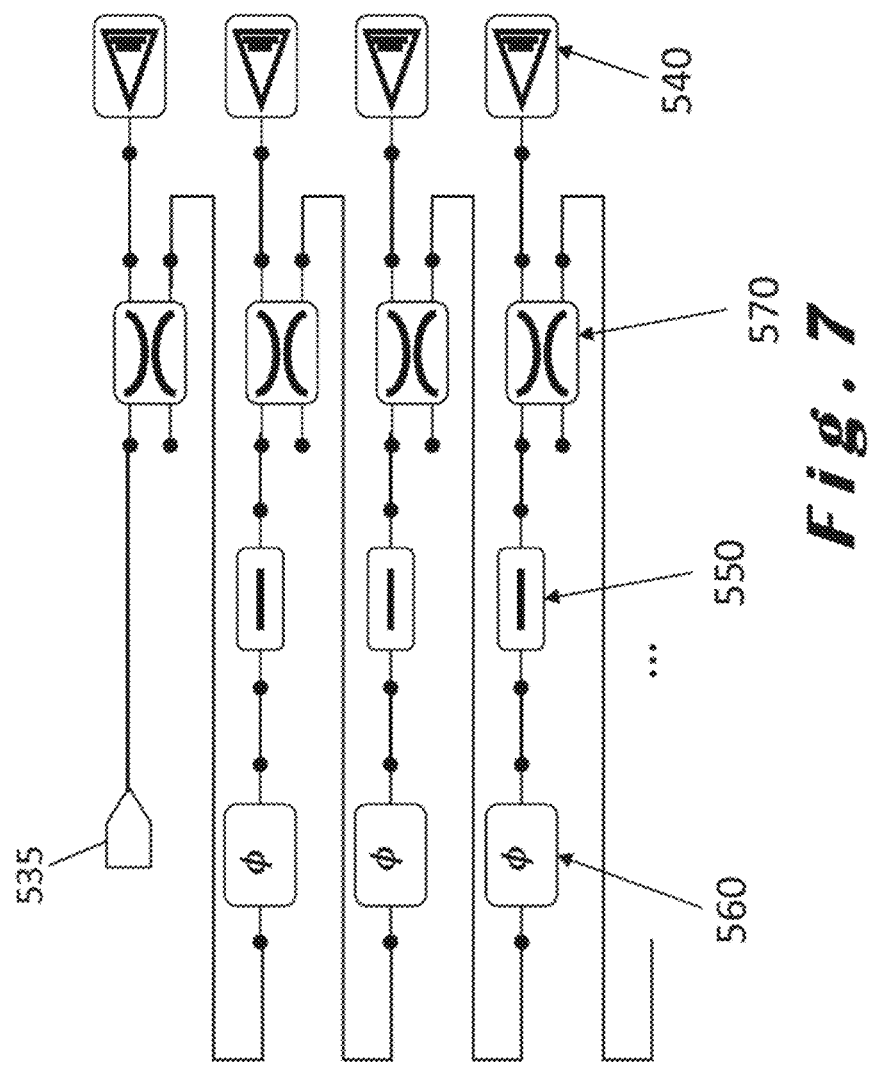
FIG. 7 shows a schematic representation of an antenna block of the dispersive phased array of FIG. 5, according to an example embodiment.
Figure 8:
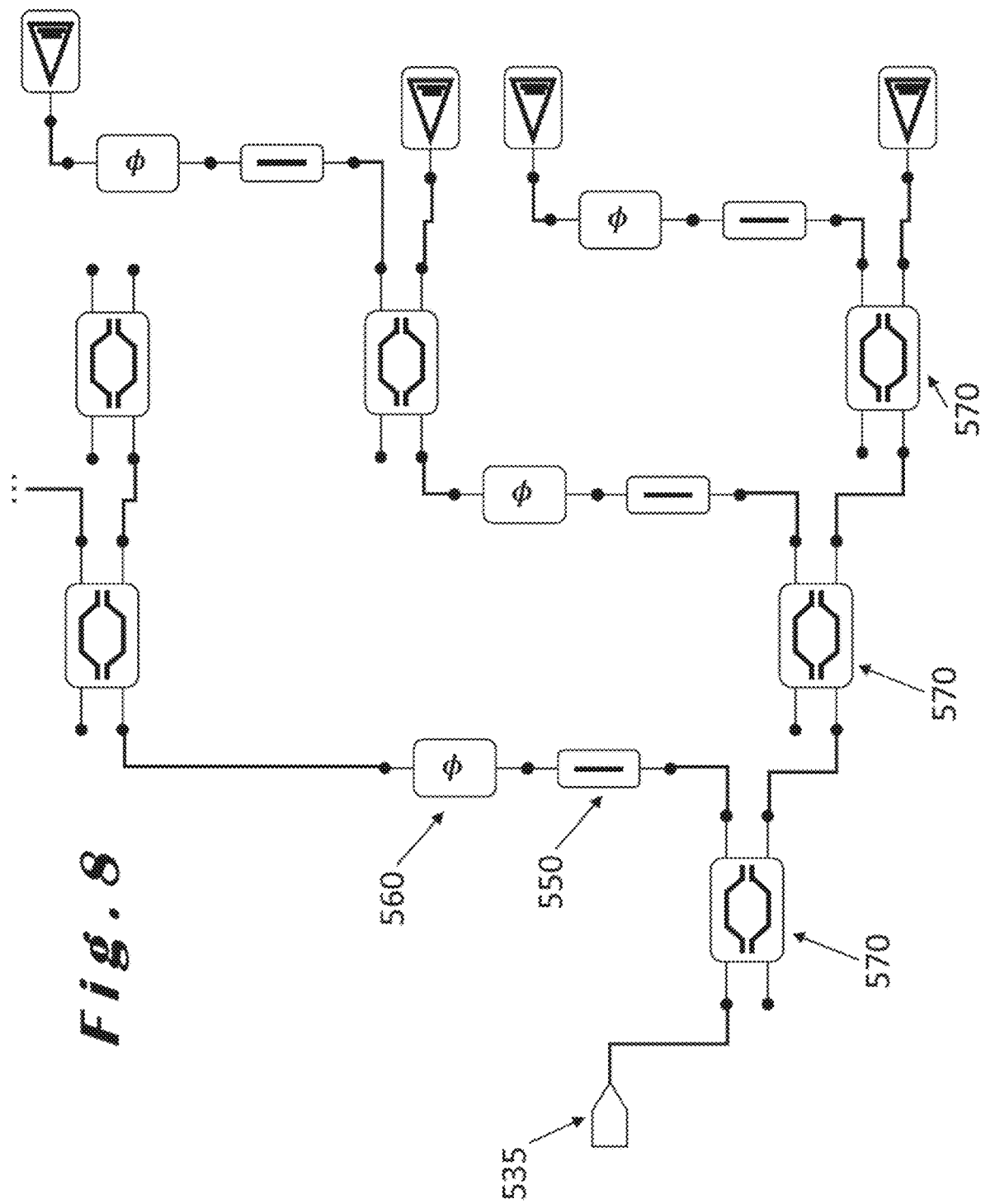
FIG. 8 shows a schematic representation of an antenna block of the dispersive phased array of FIG. 5, according to an example embodiment.

The antenna blocks $520j$ may be constructed in various ways. FIGS. 6 to 8 illustrate different possible designs. A waveguide array design is shown in FIG. 6, while a snake design is shown in FIG. 7 and an imbalanced tree is shown in FIG. 8. Each design starts from an input that is coupled to a line 535 of the array 500 and ends at the antenna 540.

In the array design of FIG. 6, a star coupler 570 is used to split the optical signal input at 535 into an array of waveguide delay lines 550. Each delay line 550 includes an optional active phase compensation module 560 that may correct small deviations in phase due to manufacturing tolerances within the delay lines 550. In the array design of FIG. 7, light is split off a regular intervals from a single bus waveguide, which can be folded in a snakelike fashion. In the imbalanced tree architecture of FIG. 8, light is split off in a hierarchical tree, where at each level one arm contains a long delay line.

These three architectures scale in very different ways as the number of antennas increases. In the waveguide array, the light is split up right away, and travels through all delays simultaneously. This requires a large area for the many long waveguides, which can also accumulate a lot of phase errors between each pair of antennas. These can be compensated by an active phase shifter. In the snake architecture, all delays are shared and light is split off sequentially. As a result, the area taken by the waveguides is reduced, and phase errors are only accumulated one delay at a time. On the other hand, the snake architecture requires precise control of the power taps. The tree architecture is situated somewhere in between in terms of scaling, requiring more overall waveguide length than the snake, but substantially less than the waveguide array.

Figure 9:
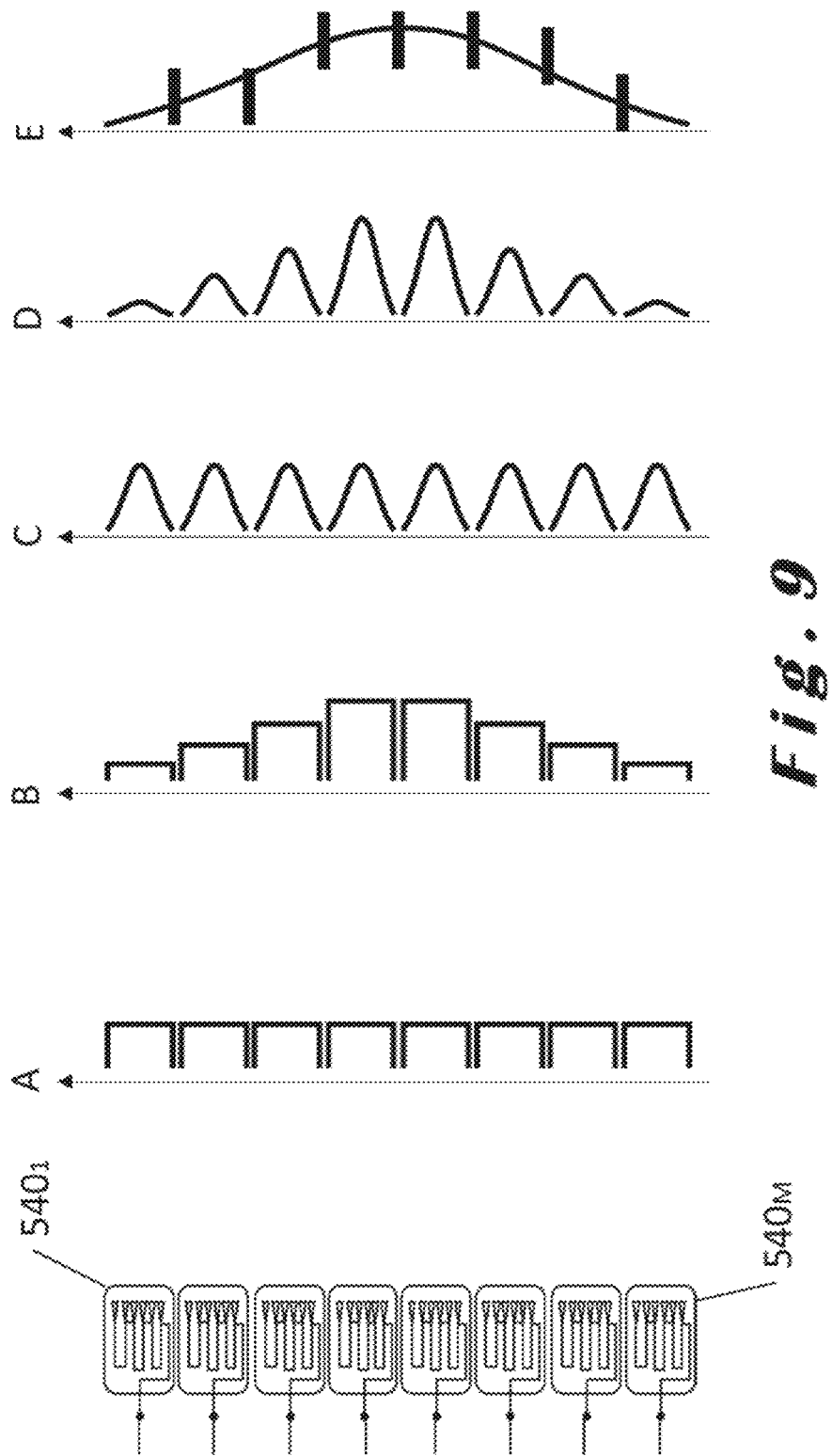
FIG. 9 shows possible configurations for power distributions in the array of FIG. 5, according to an example embodiment.

FIG. 9 illustrates possible power distributions for the array 500. Power distributions may vary within a block and/or between the blocks. The power distributions will result in different far field emission profiles, especially with respect to side lobes. In general, an optical phased array with an overall normal (Gaussian) power distribution profile will have the best suppressed side lobes, but generally only at the condition where all antennas are in phase. Using a normal power distribution within a block typically ensures that every individual block emits a beam with low side lobes, and then distributing the power between blocks will also suppress side lobes substantially. However, this does result in a somewhat broader beam. Using a uniform power distribution over either the blocks or within a block results in a far field beam profile with multiple significant side lobes, and might be undesirable.

Figure 10:
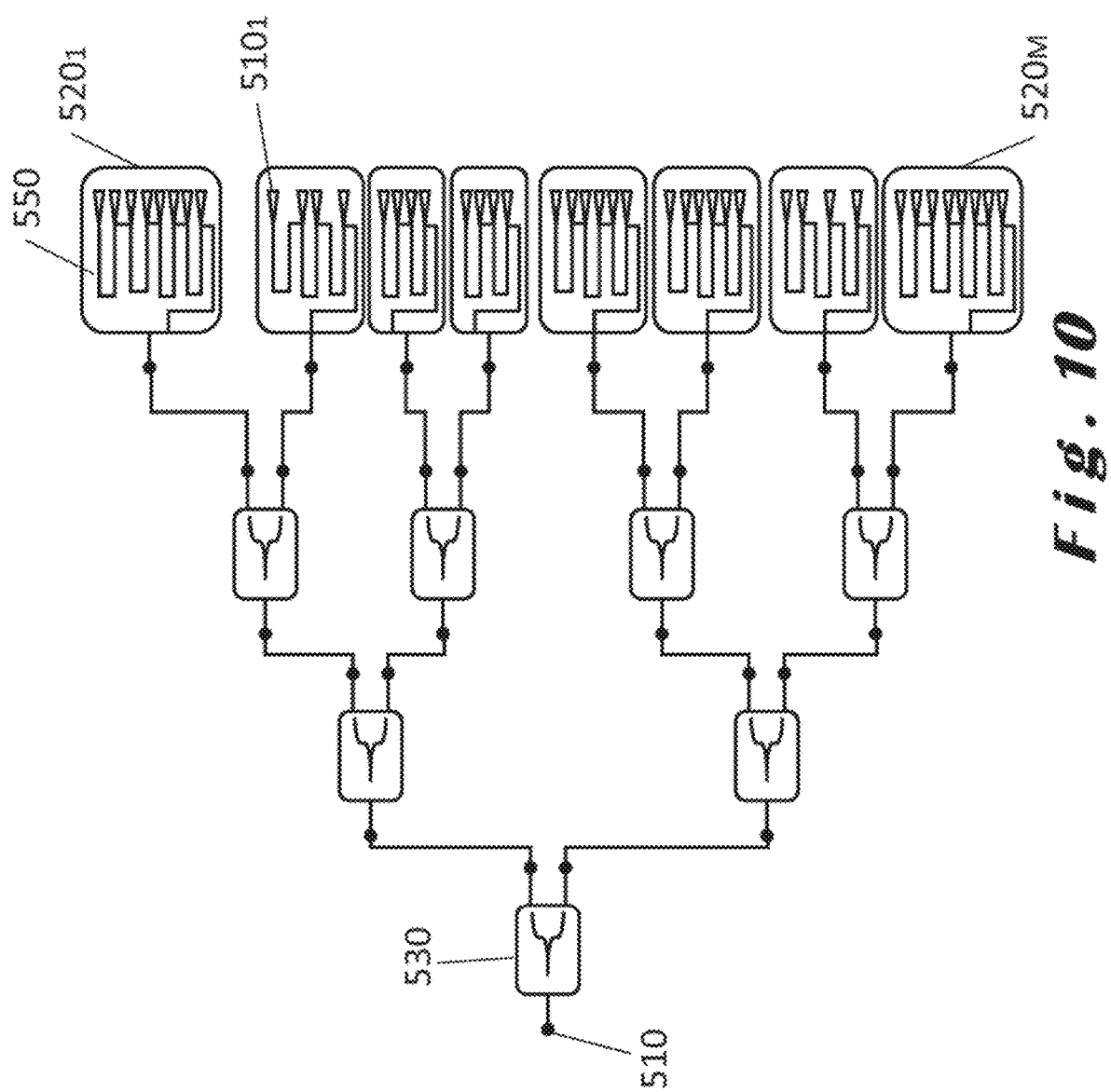
FIG. 10 shows another dispersive phased array, according to an example embodiment.

FIG. 10 illustrates that the array 500 may also have a non-uniform design. For example, the array 500 could be made more sparse in the areas with lower power. There can be different gap sizes between the blocks. Moreover, not all blocks need the same number of antennas. Blocks can have fewer antennas with the same pitch or more antennas with a different pitch. For instance, if the center blocks require more power, it might make sense to make them smaller to reduce nonlinear losses. If the outer blocks require less power, making them more sparse will introduce side lobes, but these can be acceptable.

Figure 11:
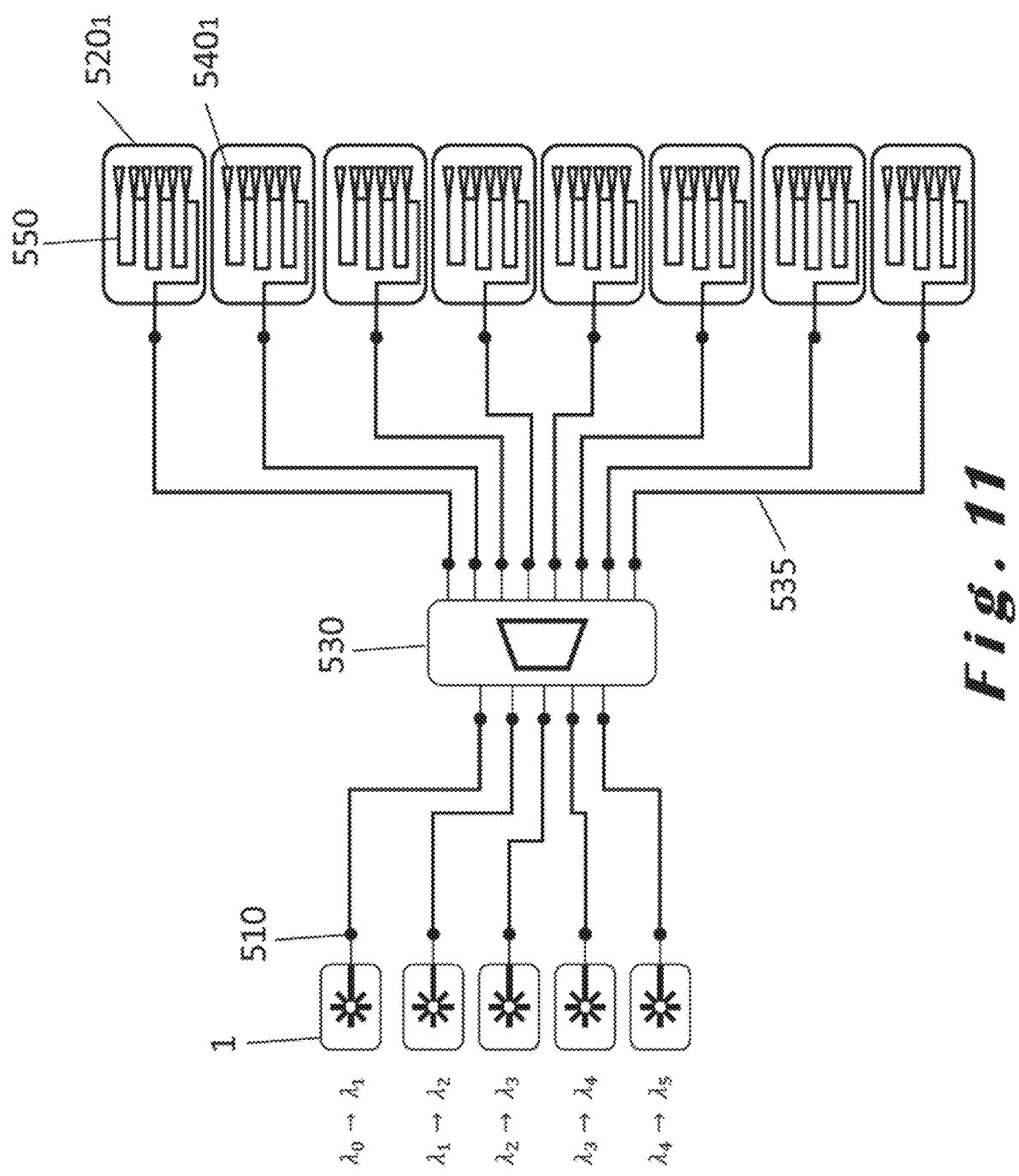
FIG. 11 shows another dispersive phased array, according to an example embodiment.

As shown in FIG. 11, the coupling means 530 may also be replaced with a single star coupler 530 and waveguides matched to have a certain length. Optionally, active phase shifters may be used for correction purposes. The potential advantage of a star coupler 530 is that it can also act as a multiplexer for different input ports. Multiple tuneable lasers can couple light into the star coupler from different input waveguides and spread their light to all output waveguides. The small phase rotation induced by off-axis injection of the different lasers into the star coupler can result in a shift of the pixel pattern in the far field, but this is not critical as long as the pattern is well known. The multiple input lasers could cover the same wavelength range, disjoint wavelength ranges, or overlapping wavelength ranges. This could also be used to relax the requirements on the tuning range of the tuneable laser, using the star coupler as a wavelength multiplexer.

Figure 12:
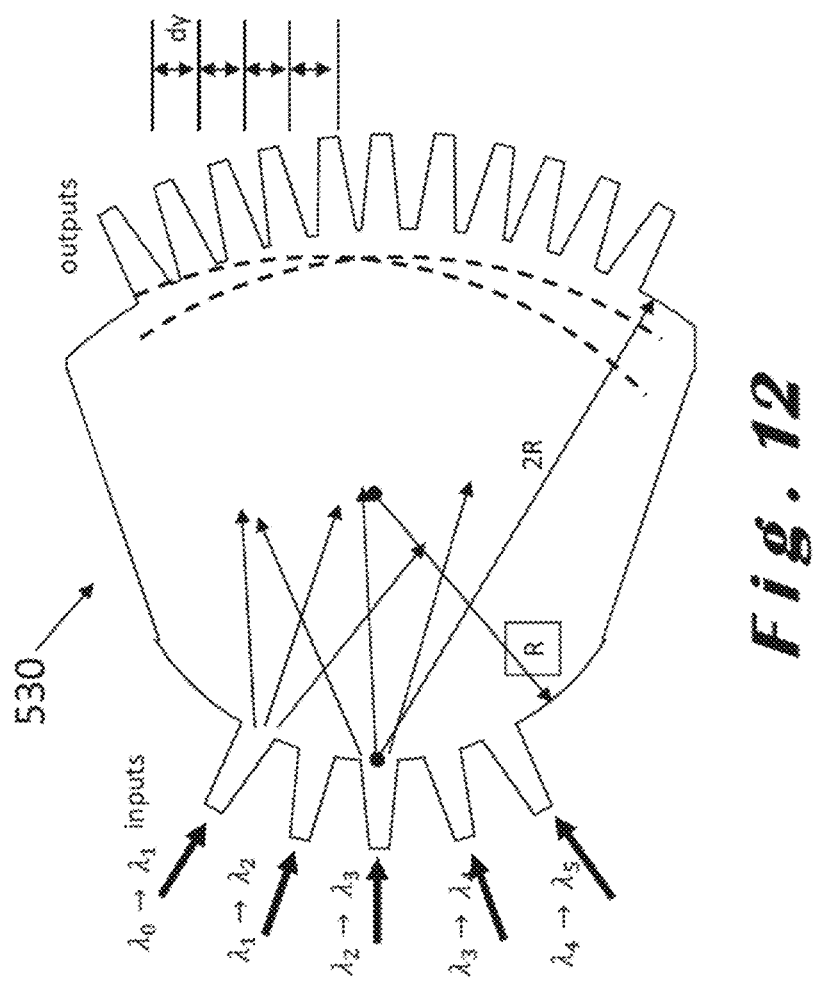
FIG. 12 shows the star coupler of FIG. 11 in more detail, according to an example embodiment.

The positioning of the inputs and outputs of such a star coupler 530 can be considered, to potentially minimize astigmatism and aberrations. The result could be that for every input the path difference to all the outputs has the same phase delay between adjacent outputs. The exact value of that phase delay is generally irrelevant, as long as the phase difference between every two outputs is constant. A configuration that approximates this condition quite well is positioning the inputs on a circle with radius R, and the outputs on a circle with radius 2R, and its center positioned on the edge of the input circle. This is the so-called Rowland configuration as shown in FIG. 12. The output could be positioned on the output circle with a constant separation in y-coordinate.

Moreover, the output waveguides in the star coupler also form a grating. This grating, in most implementations with a uniform or almost uniform spacing, also has diffraction orders on the circle of the input waveguides. To have efficient coupling, the fill factor of the output grating could be as large as possible and the input waveguides could be positioned within the first half diffraction order on each side of the center axis. Note that the direction of the diffraction orders are wavelength dependent, separated further apart for longer wavelengths. Note that the off-axis inputs on the star coupler will have some loss, mounting up to 3 dB (50%) when approaching the ±0.5 diffraction order.

Figure 13:
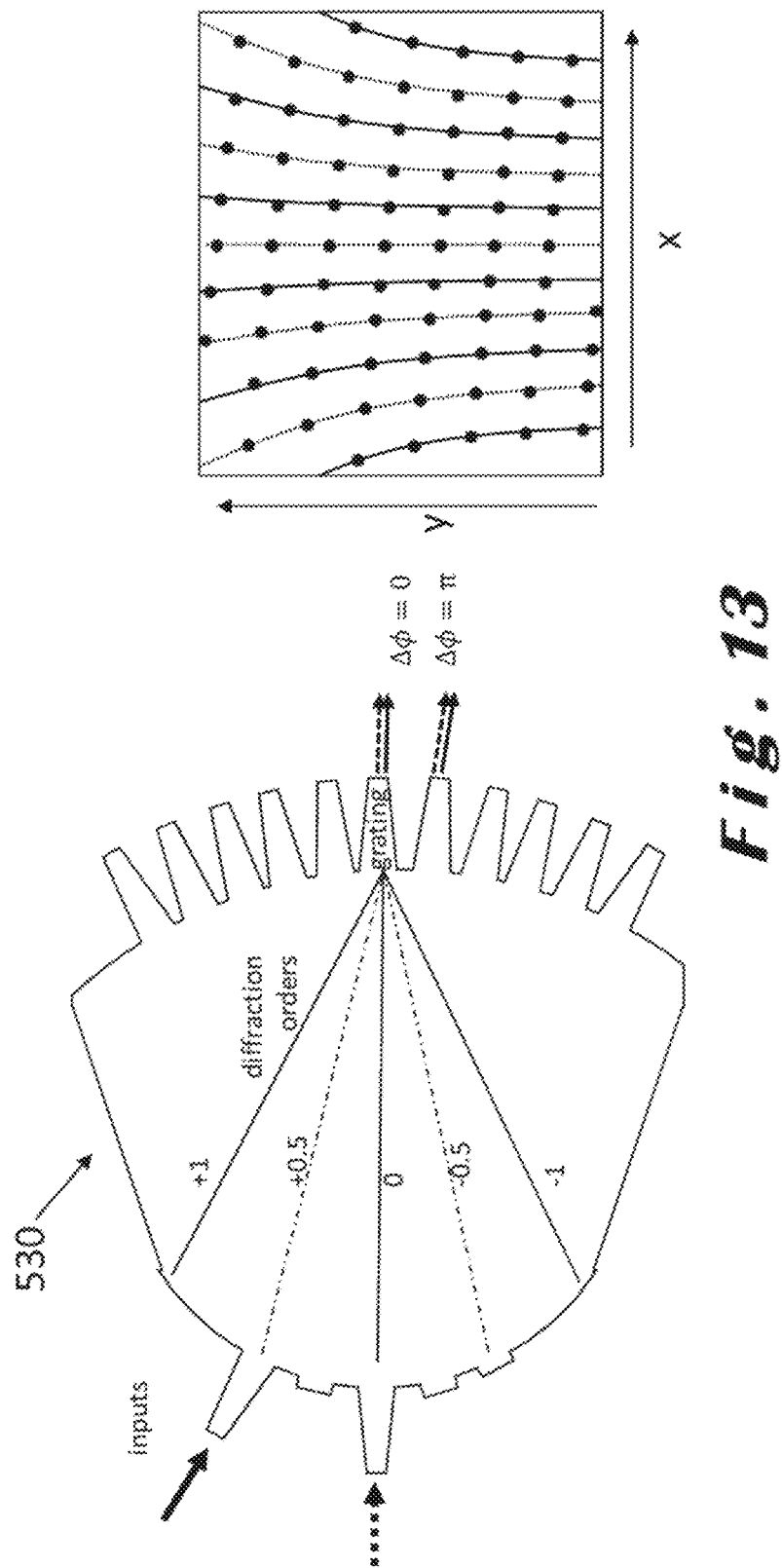
FIG. 13 shows an alternative star coupler for the array of FIG. 11 in more detail, according to an example embodiment.

As shown in FIG. 13, a star coupler may also be used to reduce the size of the blocks. When a block has n antennas, it will illuminate n positions (corresponding to the n diffraction orders) along the x-axis in the far field. When the size of the block is halved (keeping the same antenna pitch), only n/2 far-field positions will be illuminated. However, a star coupler could be used to multiplex, i.e. to send in light (at the same wavelength) but with a $\pi$ phase difference between the blocks. This light will then illuminate the positions in between. The potential advantage is that the blocks have a size n/2, which relaxes the footprint, loss, power and phase error requirements. However, 2M blocks will then be needed to meet the range criterion. To multiplex these two beams, a star coupler can be used with two inputs that are separated by a half diffraction order of the grating formed by the output waveguides. Note that these diffraction orders in the star coupler are wavelength dependent, so this interleaving will only be exact within a narrow wavelength range. Outside of this wavelength range, the interleaving will not be homogeneous.

Figure 14:
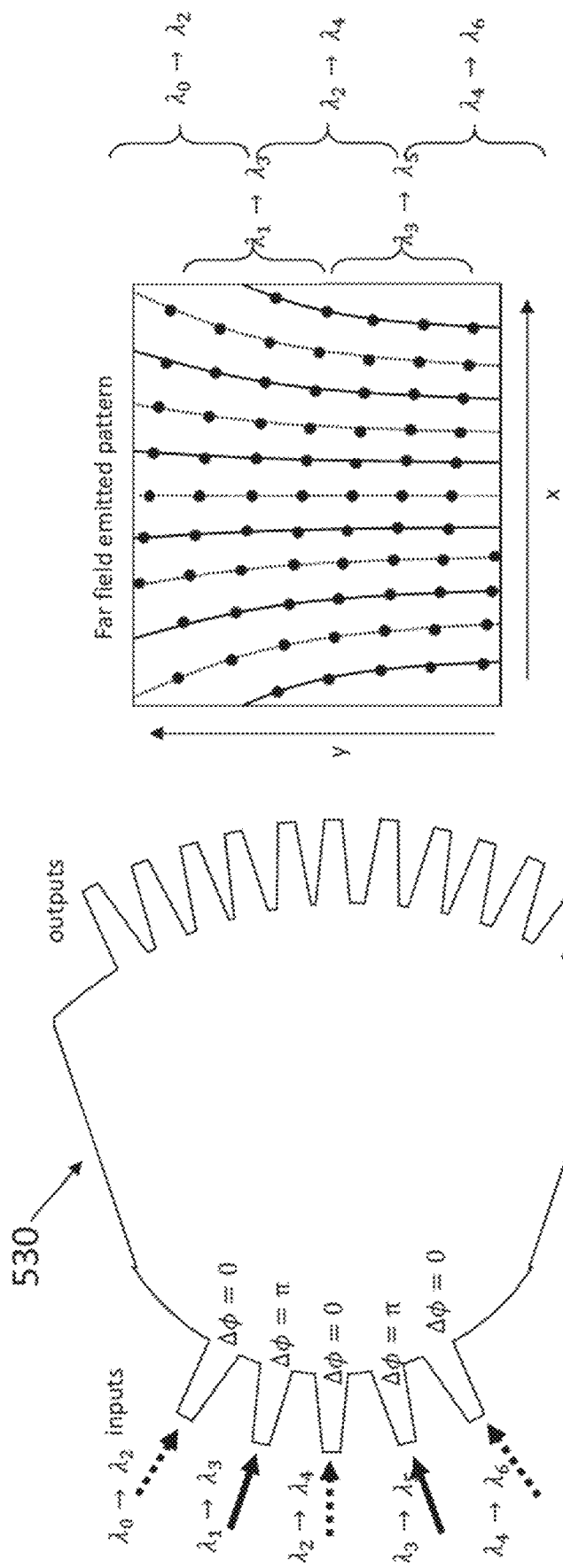
FIG. 14 shows another star coupler that may be used in a dispersive phased array, according to an example embodiment.

It will be readily appreciated that the multiplexing scheme of FIG. 13 may also be extended to more parallel channels, reducing the size of the blocks even more. Furthermore, it can also be combined with the wavelength multiplexing, by using multiple inputs for each wavelength bands. It is also possible to use tuneable lasers with overlapping wavelength bands and position them in such a way on the star coupler that they cover the full far field as shown in FIG. 14.

Figure 15:
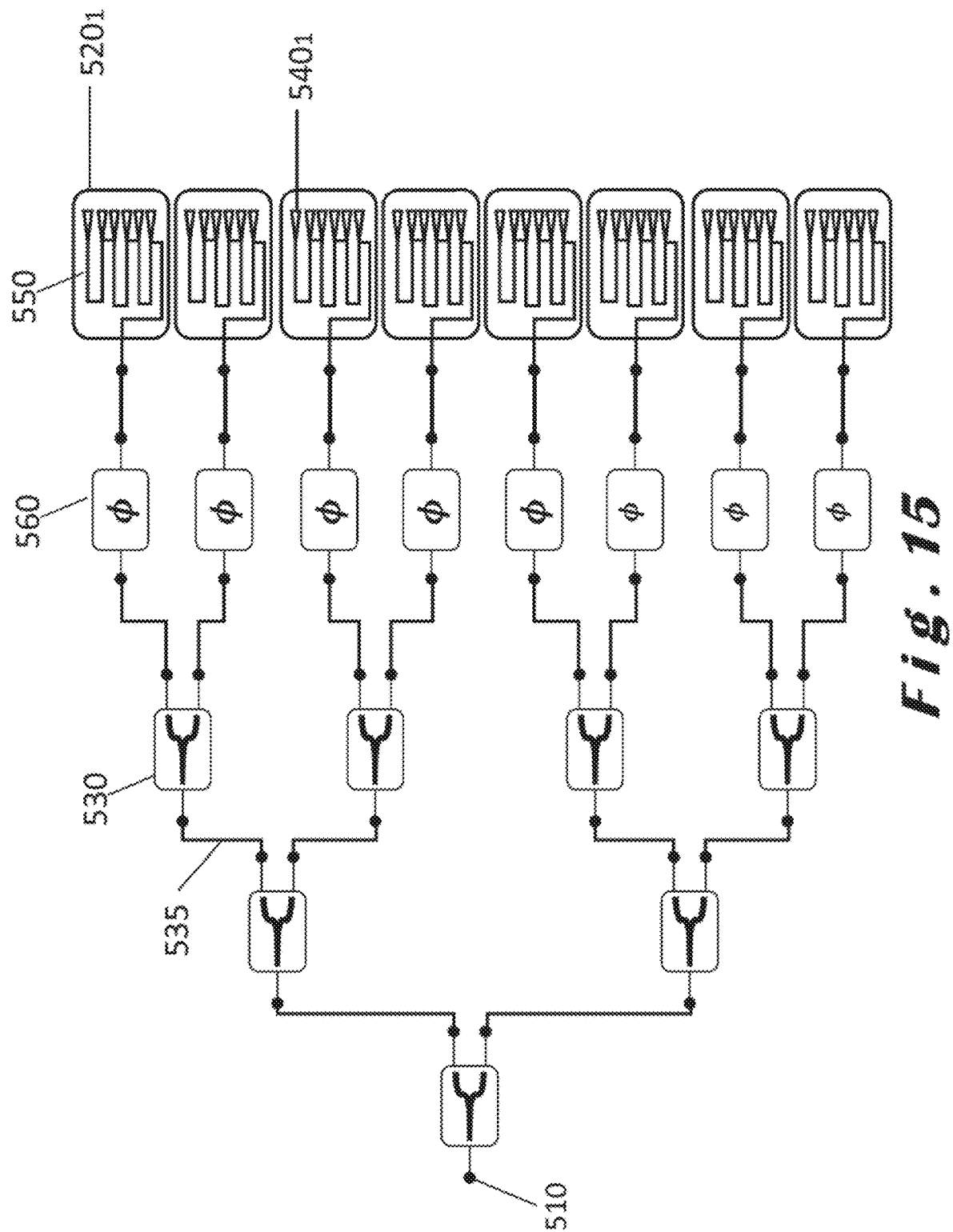
FIG. 15 shows another dispersive phased array, according to an example embodiment.

As already described above, the array 500 could be provided with active phase shifters 560 to feed the antenna blocks as shown in FIG. 15. These could be used to tune the phase delay between the blocks, but also shift the emitted pattern along the x-axis. To make this happen, the phase delay between each two blocks could be substantially the same. This can be achieved by using phase shifters that can cover a very wide phase shift between all blocks using a continuous drive and for all wavelengths. The alternative is to have a phase shifter that can give a 0-2$\pi$ (or $-\pi \rightarrow +\pi$) phase shift which is the same for all wavelengths in the operating range. In this case, the phase shifters can induce the correct phase shifts (modulo 2$\pi$), but in a stepwise fashion (in this case it is generally not possible to continuously scan the phase shifts in time).

This scanning technique could also be used to reduce the size n of a block (and increase the number of blocks M, keeping the total number of antennas the same). Using smaller blocks will reduce the sampling points along the x-axis. But if these sampling points can be actively shifted, the field can be scanned continuously, or discretely.

Figure 16:
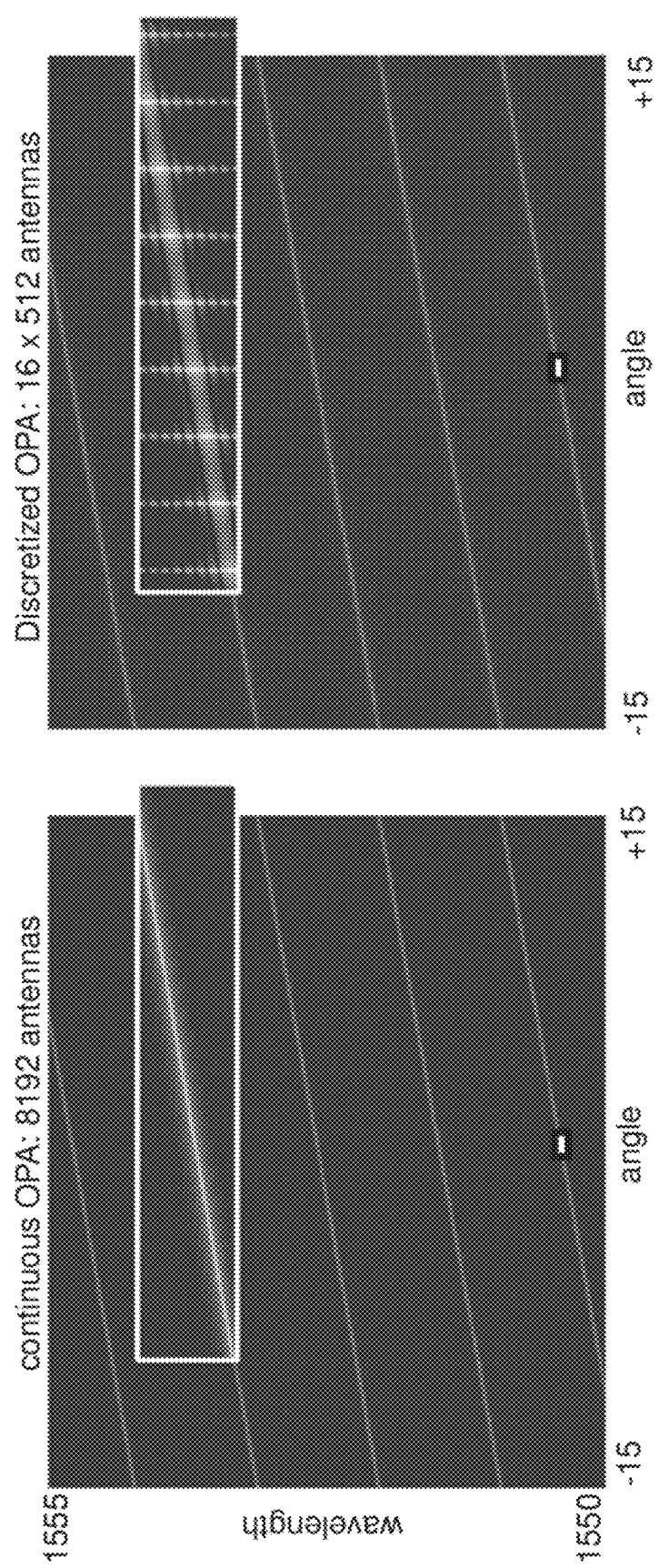
FIG. 16 shows a far-field comparison a known uniform dispersive OPA (left-hand side) and a dispersive phased array (right-hand side), according to an example embodiment.

FIG. 16 illustrates a far-field simulation result of a phased array of 8192 antennas, spaced 3 μm apart, with a 1 mm waveguide delay between them. The wavelength is swept from 1,550 nm to 1,555 nm, and the plot shows the angular emission pattern as function of wavelength. The power distribution is uniform. The left-hand side of FIG. 16 shows a monolithic dispersive OPA. It has a continuously varying emission profile. The right-hand side of FIG. 16 shows a discretized OPA consisting of 16 blocks of 512 antennas. The emission pattern shows clear discretized peaks. The side lobes originate from the power distribution of the elements, which is uniform.

The beam pattern and side lobes can be manipulated by the power distribution over the blocks and the individual antennas as described above with reference to FIG. 9. This is results are shown in FIG. 17 which shows details of the emission pattern for a discretized dispersive OPA with 16×512 antennas, with different power distributions. Top to bottom: uniform distribution; Gaussian distribution inside each block, but all blocks have the same power; Gaussian distribution within a block, and Gaussian distribution over all blocks; Gaussian distribution over all emitters.

Although aspects of the present disclosure have been described with respect to specific embodiments, it will be readily appreciated that these aspects may be implemented in other forms within the scope of the disclosure as defined by the claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:
1. A dispersive optical phased array for two-dimensional scanning, the dispersive optical phased array comprising:
  a coherent light source configured to generate coherent light having a time-varying carrier wavelength that varies within a predefined carrier wavelength interval;

a splitter configured to receive the coherent light from the coherent light source;

a first antenna block configured to receive the coherent light from the splitter, the first antenna block comprising a first antenna, a second antenna, and a first delay line, wherein the first antenna and the second antenna are aligned along a line and the first delay line couples the first antenna to the second antenna with a first phase delay that is dependent on the time-varying carrier wavelength; and a second antenna block configured to receive the coherent light from the splitter, the second antenna block comprising a third antenna, a fourth antenna, and a second delay line, wherein the third antenna and the fourth antenna are also aligned along the line and the second delay line couples the third antenna to the fourth antenna with a second phase delay that is dependent on the time-varying carrier wavelength, wherein there exists at least one wavelength of the time-varying carrier wavelength within the predefined carrier wavelength interval at which the first antenna, the second antenna, the third antenna, and the fourth antenna are substantially in phase with one another.

2. The dispersive optical phased array according to claim 1, wherein a third phase delay between the second antenna and the third antenna is substantially equal to the first phase delay between the first antenna and the second antenna for the at least one wavelength.

3. The dispersive optical phased array according to claim 1, wherein the first antenna block comprises a first plurality of antennas that comprise the first antenna, the second antenna, and a fifth antenna that has a largest phase delay of any antenna of the first plurality of antennas with respect to the first antenna, wherein the second antenna block comprises a second plurality of antennas that comprise the third antenna and the fourth antenna, and wherein a third phase delay between the fifth antenna and the third antenna is substantially equal to the first phase delay between the first antenna and the second antenna for the at least one wavelength.

4. The dispersive optical phased array according to claim 1, wherein the splitter is configured to provide the coherent light to the first antenna block and the second antenna block at the same phase for substantially all carrier wavelengths within the predefined carrier wavelength interval.

5. The dispersive optical phased array according to claim 1, further comprising a phase shifter configured to eliminate phase delay of the coherent light between the first antenna block and the second antenna block.

6. The dispersive optical phased array according to claim 1, further comprising a third antenna block, a fourth antenna block, and a phase shifter configured to phase shift the coherent light provided to the third antenna block and the fourth antenna block with respect to the first antenna block and the second antenna block.

7. The dispersive optical phased array according to claim 1, wherein the first antenna block and the second antenna block have the same footprint area.

8. The dispersive optical phased array according to claim 1, wherein the first antenna block has the same number of antennas as the second antenna block.

9. The dispersive optical phased array according to claim 1, wherein the coherent light source comprises a wavelength tunable laser.

10. The dispersive optical phased array according to claim 1, wherein the splitter comprises a star coupler.

11. The dispersive optical phased array according to claim 10, wherein the star coupler is set up in a Rowland configuration.

12. The dispersive optical phased array according to claim 1, wherein the splitter comprises a star coupler having output waveguides and inputs, wherein the inputs are distributed between the −0.5 and +0.5 diffraction order of the output waveguides such that a phase difference of the coherent light arriving at adjacent antennas is substantially different for each of the inputs.

13. The dispersive optical phased array according to claim 1, further comprising a third antenna block, wherein the first antenna block, the second antenna block, and the third antenna block are organized in a snake pattern.

14. The dispersive optical phased array according to claim 1, further comprising a third antenna block, wherein the first antenna block, the second antenna block, and the third antenna block are organized in an imbalanced tree.

15. The dispersive optical phased array according to claim 1, further comprising a third antenna block, wherein the first antenna block, the second antenna block, and the third antenna block are non-uniformly positioned along the line.

16. The dispersive optical phased array according to claim 1, further comprising a third antenna block, wherein a spacing between the first antenna block, the second antenna block, and the third antenna block is non-uniform.

17. The dispersive optical phased array according to claim 1, wherein power is distributed over the first antenna block and the second antenna block in a normal distribution.

18. The dispersive optical phased array according to claim 1, wherein power is distributed over the first antenna, the second antenna, the third antenna, and the fourth antenna in a normal distribution.

19. The dispersive optical phased array according to claim 1, wherein an optical path length difference between the first antenna and the second antenna is constant such that the first phase delay is given by $k*2\pi\Delta L/\lambda(t)$.

20. The dispersive optical phased array according to claim 1, the first antenna block further comprising a fifth antenna, wherein the first antenna, the second antenna, and the fifth antenna are periodically positioned.

* * * * *